FIG_5_

FIG_6_

INVENTOR.
Charles E. Kerr
BY Philip A. Minnis
ATTORNEY

Patented June 17, 1941

2,245,861

UNITED STATES PATENT OFFICE 2,245,861

CORN HUSKER

Charles E. Kerr, Hoopeston, Ill., assignor to Food Machinery Corporation, San Jose, Calif., a corporation of Delaware Application July 1, 1938, Serial No. 216,947

20 Claims. (Cl. 130—5)

My invention relates to corn huskers, and is concerned more particularly with the provision of improved husking mechanism therefor.

It is a general object of my invention to provide a corn husker of large capacity, and which is effective and smooth in operation.

Another object of the invention is to provide a corn husker capable of husking of both large and small ears of corn at a high rate of speed with equal facility and without damage to the ears.

Another object of the invention is to provide husking means in a double row corn husker in which the ears of corn are fed in a positive manner during the husking operation.

Another object of the invention is to provide a corn husker in which the feed for the husking mechanism provides for easy and rapid feeding thereof.

Another object of the invention is to provide an improved corn husker of the type in which the ears of corn are progressing longitudinally over a single set of husking rolls to perform the husking operation.

Another object of the invention is to provide an improved corn husker which attains the foregoing objects and which is constructed to promote economical manufacture and assembly.

Other objects and advantages will be apparent from the following description of a preferred embodiment of my impoved corn husker as illustrated in the accompanying drawings.

The present invention may be preferably embodied in a corn husker in which two parallel rows of ears of corn are placed in a conveyor which carries the ears of corn through the machine in a position transverse to their direction of travel. As the ears of corn move along their path of travel, they are first positioned correctly for the butting operation which may be performed by stationary butting knives, and then are moved past husk ripping means which serve to tear loose the husks from the ears of corn to provide projecting husk portions for engagement by the husking means. Subsequently, the conveyor delivers the ears of corn to the husking means which is preferably in the form of two parallel sets of husking rolls, one for each row of corn passing through the corn husker, which are disposed transversely of the corn husker adjacent the rear end thereof.

A single conveyor or feed means preferably cooperates with both sets of husking rolls to move the ears of corn longitudinally of the rolls in a positive fashion during the husking operation. Preferably, such feed means is driven continuously by drive means which provides alternate rapid and slow rates of movement of such feed means in synchronism with the operation of the conveyor to provide periodic dwells in the operation to facilitate delivery of the ears of corn to the husking rolls in rapid succession and also, if desired, to provide two husking operations on each ear of corn by the husking rolls to which the ear is delivered.

The corn husker includes a frame 10 (Figs. 1 to 4) on which the various elements of the corn husker and the driving means therefor are mounted. Along the upper part of the frame, an endless horizontal conveyor 11 is provided, comprising a series of spaced apart flights or bars 12 extending transversely of the frame and supported at their ends by respective parallel chains 13. At the discharge end of the conveyor, the chains 13 (Fig. 5) are trained about a pair of similar driving sprockets 16 secured on a transverse shaft 17 suitably journalled in the frame 10, and at the feed end, the chains may be trained about suitable idler sprockets (not shown).

At one end, the shaft 17 (Figs. 2 and 3) carries a sprocket 18 which is connected by a chain 19 with a sprocket 20 on the end of a shaft 21. The shaft 21 (Figs. 3 and 4) extends across and is journalled in suitable bearings at the rear end of the frame and its right end carries a gear 22

(Fig. 1) meshing with a pinion 23 of a transverse drive shaft 24 also journalled in suitable bearings on the frame. At one end, the drive shaft 24 (Figs. 3 and 4) is provided with a pulley 26 by means of which a drive may be received and transmitted to the shaft 24 through suitable clutch mechanism 27 having a control lever 28. A hand wheel 29 is secured on the shaft 24 and provides a manual drive for the machine, if this is desired for adjustment or inspection.

Figure 1:
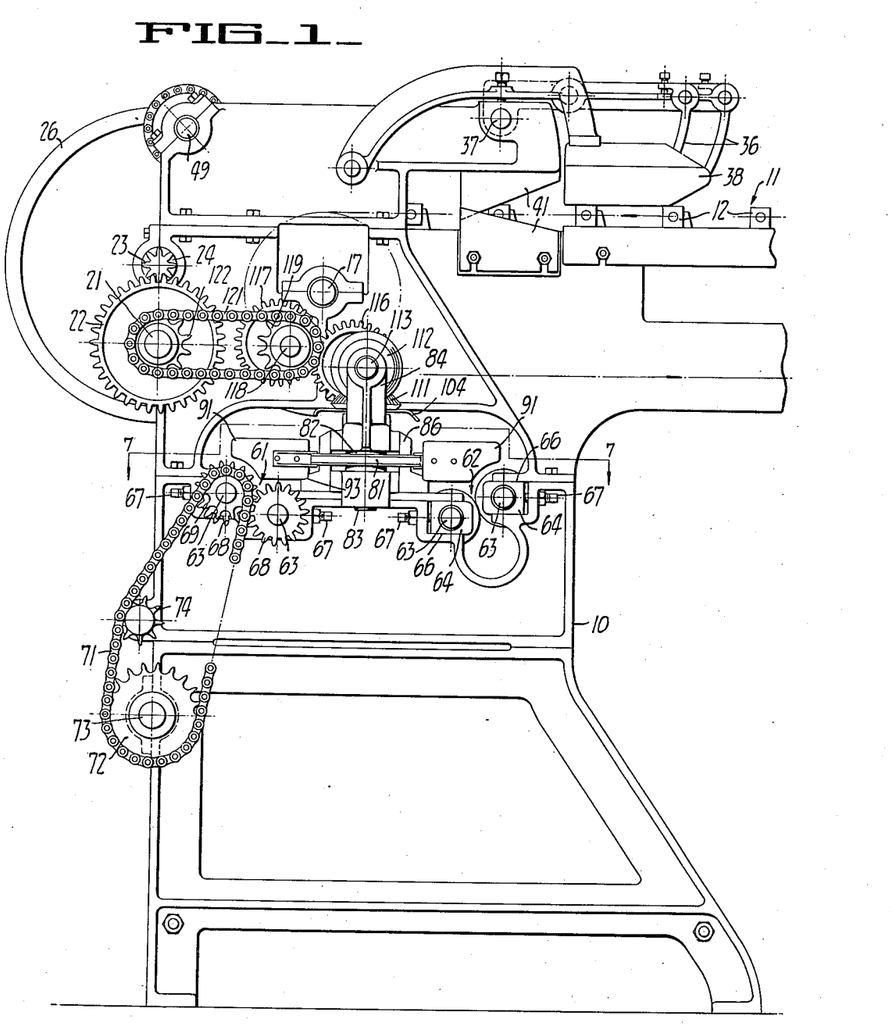
Fig. 1 is a left side elevation of a corn husker embodying my invention with a portion of the feed or front end of the husker omitted, the view being taken as indicated by the arrow 1 in Fig. 3.
Figure 2:
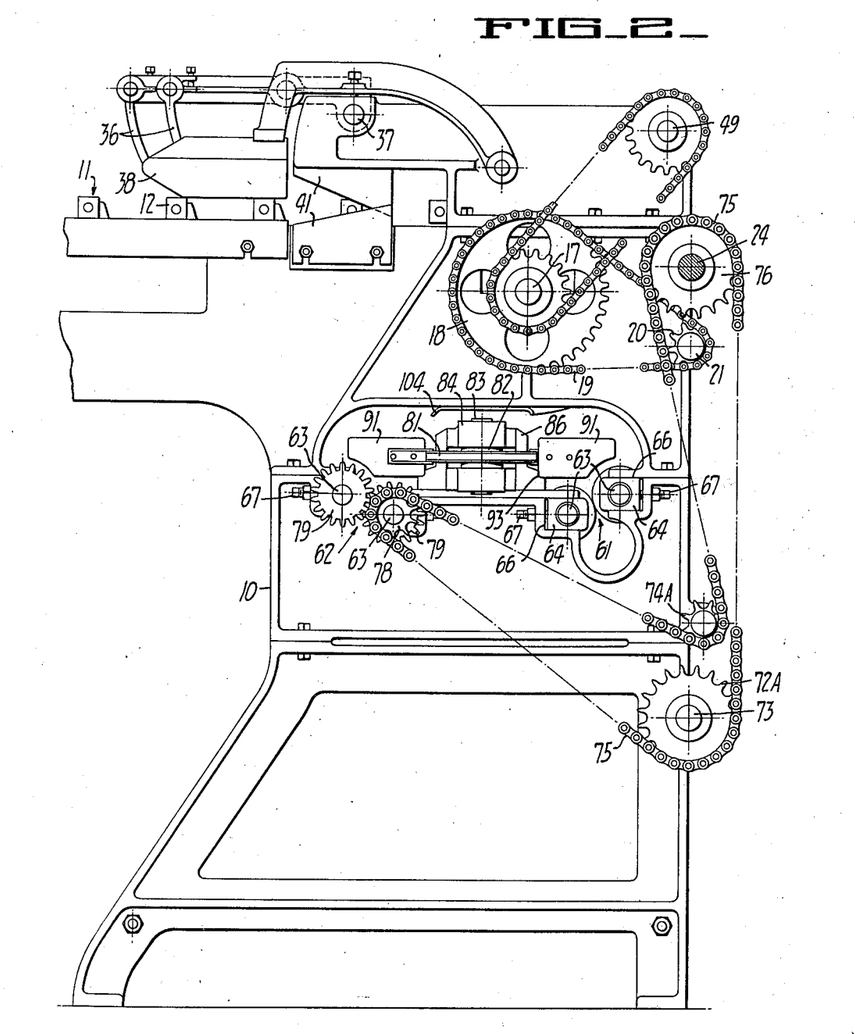
Fig. 2 is a right side elevation of the corn husker with the drive assembly omitted, the view being taken as indicated by the arrow 2 in Fig. 3.

By operation of the above drive means, the upper run of the chains 13 and the flights 12 are driven in the direction indicated by the arrow in Fig. 1 so that ears of corn placed between the flights will be carried along over a frame plate or table 31 (Figs. 3 and 5) which is suitably mounted on the frame 10 immediately beneath the upper run of the flights 12.

The ears of corn are placed between the flights 12 of the conveyor, with their butt ends toward the sides of the husker. As stated above, the first operation on the ears of corn is the positioning of the ears for the butting operation. For this purpose, the husker is provided with opposite similar ear mover gears 32 (Figs. 3 and 8) for the respective rows of corn, of the general character disclosed in my co-pending application, Serial No. 166,990, filed October 2, 1937 which matured to Patent No. 2,177,988 granted Oct. 31, 1939. Each gear 32 (Fig. 8) is journalled for rotation by obliquely disposed shaft 33 and is driven from a shaft 34 suitably connected to the drive means so that its frusto-conical toothed surface projects slightly above the table 31 and is travelling toward the side of the husker. The ears of corn are held against the respective gears 32 by respective floating presser arms 36 (Figs. 1, 2 and 3), pivotally mounted at 37 on the husker frame. The operation of the gears 32 and the presser arms 36 serves to move the ears of corn toward the sides of the husker to engage the butt ends thereof with respective gauges 38 which are suitably mounted on the frame at either side of the conveyor to position the ears of corn properly for the butting operation.

After such positioning, the ears of corn of each row are moved into engagement with similar sets of butt severing knives 41 (Figs. 1 and 2), and are held in place during the butt severing operation by the respective floating presser arms 42 (Figs. 3 and 5) depending from the respective arms 36. This structure is conventional and therefore is not described in detail.

After the butting operation, the ears of corn of each row are moved past husk ripping means in the form of respective upper and lower sets of husk ripping discs 46, 47 (Figs. 3 and 5) which are rotated oppositely so that their adjacent teeth travel oppositely to the direction of movement of the ears of corn. Each set of upper discs 46 is mounted for floating engagement with the ears of corn by an arm 48 pivoted on a shaft 49. The depth of cut of the discs 46 is controlled by an arcuate gauge plate 51 adjustably mounted on the arm 48 and through which the discs 46 project for a distance controlled by the relative adjustment of the plate 51 to the arm 48. The gauge plate 51 serves to determine the depth of cut of the discs 46 and also serves to clean such discs of any loose pieces of husks and silk.

Each set of lower ripping discs 47 (Fig. 5) is adjustably carried by means of an arm 52 pivoted on the shaft 17 and an adjustable connection 53 between the arm 52 and a slotted plate 54 which is preferably mounted as an extension of the table 31. The adjustable connection determines the extent of projection of the teeth of the discs 47 through the plate 54. The discs 46 and 47 may be driven in any convenient manner so that the teeth thereof simultaneously engage the ears of corn and travel oppositely to the direction of movement of the corn. The construction and operation of the ripping discs do not form a part of the subject matter of this application, but are disclosed and claimed in my copending application, Serial No. 215,887, filed June 25, 1938.

Figure 5:
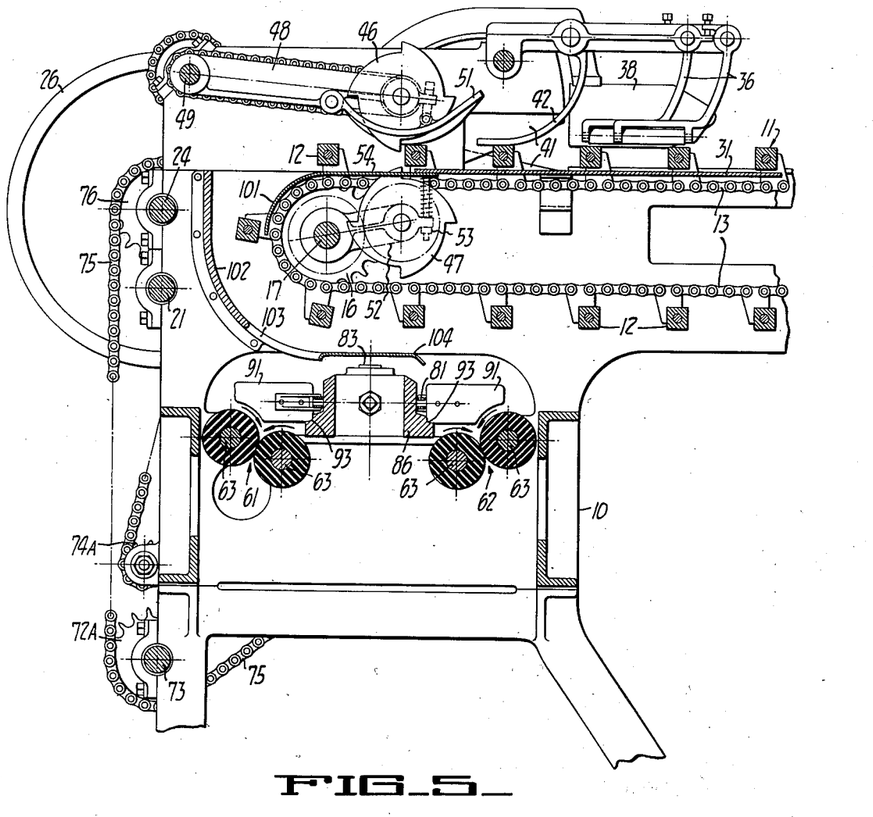
Fig. 5 is a vertical longitudinal section through the rear portion of the machine, and is taken in the plane indicated by the line 5—5 in Fig. 3.
Figures 7, 8:
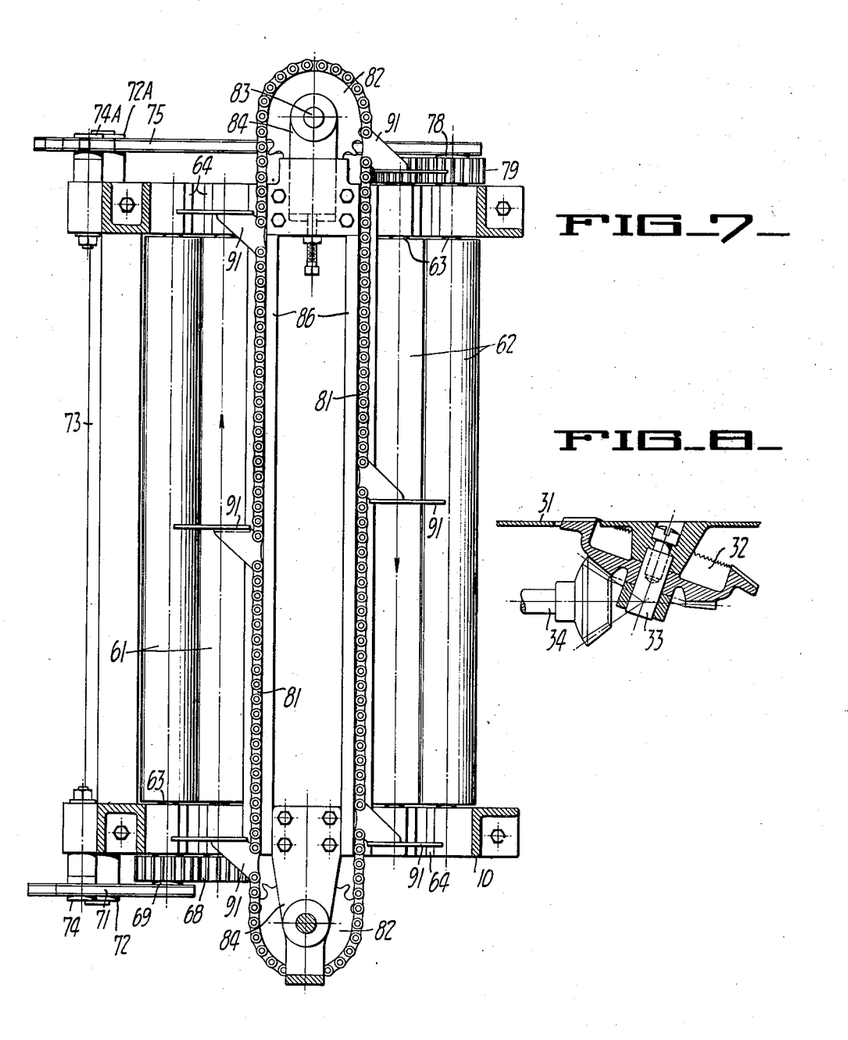
Fig. 7 is a plan view of the husking means and the feeding means associated therewith, the view being taken along the line 7—7 in Fig. 1.
Fig. 8 is a detailed section of the ear mover gear taken in the plane of the line 8—8 in Fig. 3.

Below the discharge end of the conveyor, the respective sets of husking rolls 61 and 62 (Figs. 1, 5 and 7) are provided extending transversely of the machine and transversely of the direction of travel of the ears of corn carried by the conveyor 11. As illustrated in Figs. 5 and 7, the sets of husking rolls 61 and 62 are similar and similarly mounted. Rolls 61 and 62 are preferably of resilient material such as soft rubber and are driven in opposite directions so that their engaging faces will serve to feed any material caught therebetween downwardly between the rolls.

The shaft 63 (Figs. 1, 2 and 7) of each roll is journalled in respective bearing blocks 64 mounted in corresponding seats 66 at opposite sides of the frame. Each pair of rolls may be adjusted by means of respective adjusting screws 67 threaded in the associated seats 66 and engaging the respective bearing blocks 64. The rolls 61 (Figs. 1 and 7) are provided at one end with a pair of intermeshing gears 68 and are driven by means of a sprocket 69 on the shaft 63 of one roll 61, and a chain 71 (Fig. 1), from a sprocket 72 on an end of a transverse shaft 73 (Fig. 4) suitably journalled on the frame. The chain 71 also engages a suitable idler sprocket 74. At its left end, the shaft 73 (Figs. 2 and 4) carries a similar sprocket 72A driven by chain 75 from a sprocket 76 on the drive shaft 24. The chain 75 (Fig. 2) also engages an idler sprocket 74A and a sprocket 78 at one end of the shaft 63 of one roll 62. The rolls 62 are provided with intermeshing gears 79 so that they have opposite directions of rotation, similarly to rolls 61, with their engaged faces travelling downwardly.

Common feed means are associated with respective sets of rolls 61, 62 for effecting positive movement of ears of corn longitudinally of the rolls as the ears are delivered thereto from the respective rows of corn being progressed by the conveyor 11. A chain 81 (Fig. 7) is trained about respective sprockets 82 which are mounted in horizontal position by respective shafts 83 thereof journalled in vertical position by respective brackets 84 secured at the ends of a transversely extending frame member 86. The chain 81 carries a plurality of flights 91 extending laterally outward therefrom at equally spaced intervals to overlie the sets of husking rolls 61 and 62. As seen more clearly in Fig. 5, the flights 91 have their inner edges supported and guided in opposite seats 93 extending along each side of the frame member 86 for substantially the full length of the rolls 61, 62.

Figure 3:
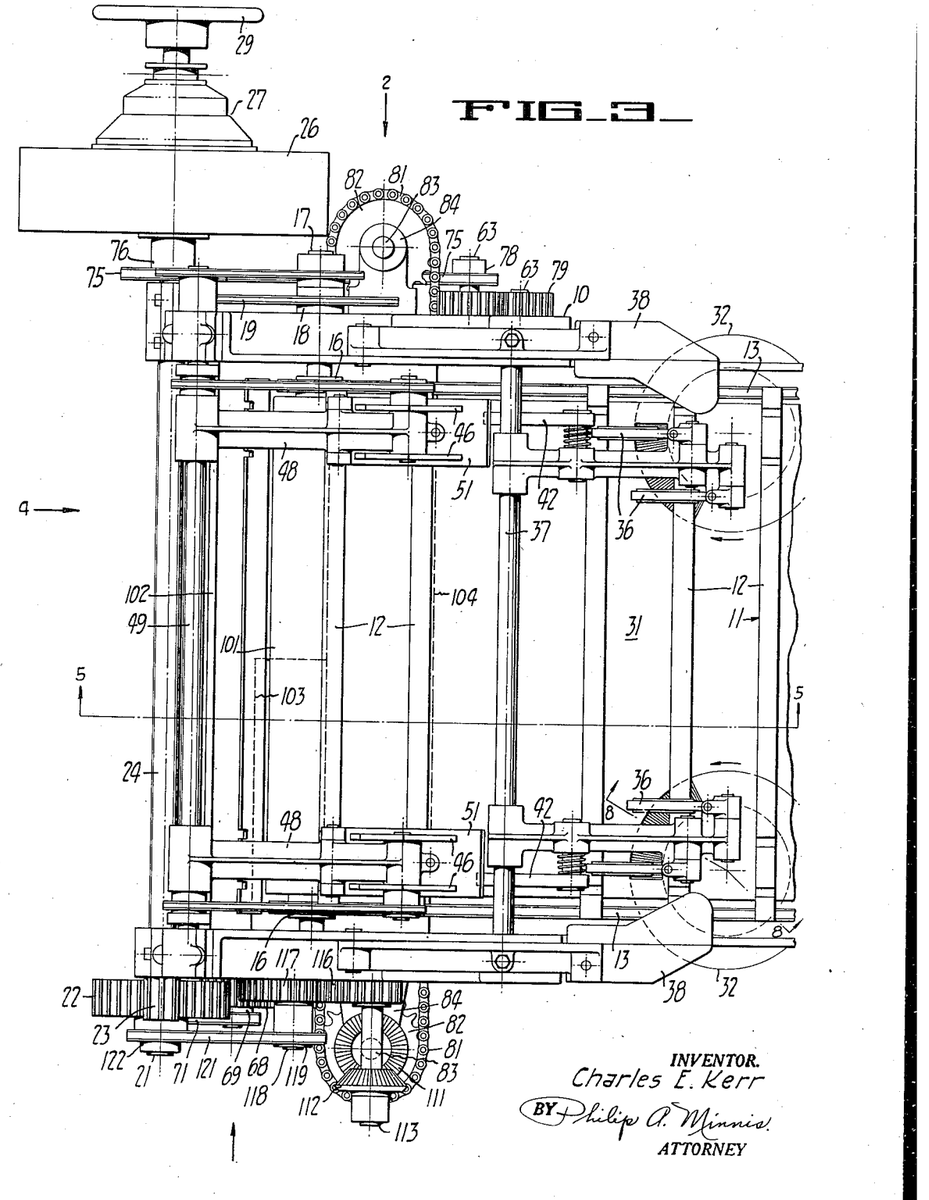
Fig. 3 is a plan view of the corn husker illustrated in Fig. 1.

The above described arrangement of the husking rolls and the feed means therefor, and their location in a transverse position at the rear end of the husker, is advantageous in providing for rapid and effective delivery of the ears of corn thereto. As seen in Fig. 5, the plate 54 is provided with an arcuate extension 101 over which the ears of corn are discharged by the flights 12. A discharge chute is provided for cooperation with the discharge end of the conveyor in the form of a transverse wall 102 mounted on the frame 10. The wall 102 is straight at its upper portion and then curves to conform to the travel of the flights 12 around the drive sprockets 16. Adjacent and above the feed end of the husking rolls 61, the wall 102 is cut away to provide discharge opening 103 so that ears of corn on the near side, as viewed in Fig. 3, are discharged onto the near ends of the rolls 61 as viewed in Fig. 7. Correspondingly, the other or remote row of corn as viewed in Fig. 3 travels over the wall 102 and an extension 104 thereof (Fig. 5) and is discharged onto the opposite ends of the rolls 62 as viewed in Fig. 7. Thus, the wall 102 is provided at 103 and 104 with staggered discharge points for delivery of the ears of corn from the two rows to the two sets of husking rolls.

The operation of the conveyor is synchronized with the operation of the feed means including the flights 91 for the husking rolls, the corresponding positions thereof being indicated in Figs. 5 and 7, and to enable clearer understanding of this synchronization of the machine the drive for the feed means will now be described.

Figure 4:
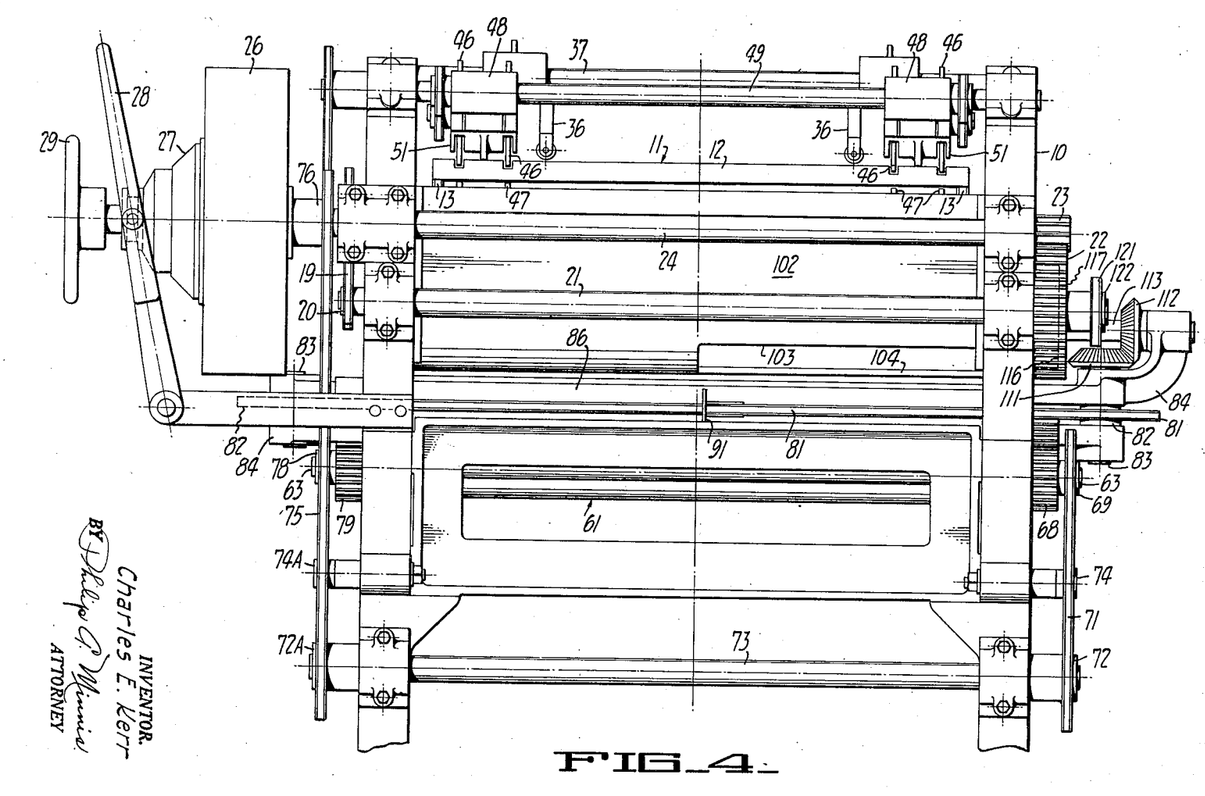
Fig. 4 is a rear elevation of the corn husker, the view being taken as indicated by the arrow 4 in Fig. 3.
Figure 6:
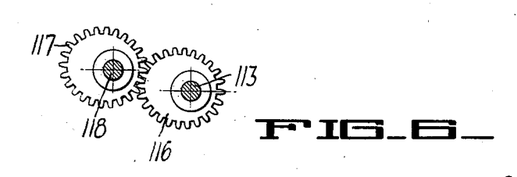
Fig. 6 is a detail view of the elliptical gears for driving the feeding means associated with the husking rolls.

As seen in Figs. 1, 3 and 4, the right hand shaft 83 carrying the driving sprocket 82 for the feed chain 81 extends upwardly through the bracket 84 and carries a bevel gear 111, which meshes with a bevel gear 112 secured on a shaft 113 journalled in the bracket 84 and in a suitable bearing on the frame. The shaft 113 (Figs. 1 and 6) carries an elliptical gear 116 which meshes with a similar gear 117 carried by a shaft 118 on frame 10. The shaft 118 (Figs. 1 and 3) also carries a sprocket 119 which is connected by a chain 121 with a sprocket 122 on the shaft 21.

By virtue of the elliptical gears 116, 117, the feed means including the flights 91 is driven continuously but at a variable rate of speed during each cycle or revolution of the gears, so that the movement of the feed means is alternately fast and then slow to provide cyclic dwells in the operation of the feed means. The parts of the machine are synchronized so that a flight 12 as viewed in Fig. 5 discharges an ear of corn through the feed opening 103 and off the discharge plate 104 during a dwell in the travel of the feed means, this dwell beginning with the parts as shown in Fig. 7.

As stated above, the advantage of this particular construction and mode of operation is that it provides for rapid and effective delivery of the ears of corn to the husking rolls. The relative positions of flights 12 and 91 illustrated in Figs. 5 and 7 occur at the moment of transfer of corn from the upper conveyor to the lower. It is a delivery phase in the cycle of operation of flights 12; and a receiving phase in the cycle of operation of flights 91. To obtain the most efficient handling of corn at this critical point of transfer not only is the delivery phase of flight 12 synchronized with the receiving phase of flight 91, but the receiving phase of flight 91 is prolonged by causing flight 91 to dwell in the position of Fig. 7. In this position the husking rolls are left clear to receive corn. In the embodiment of the invention chosen for illustration there are six flights 91 on feed chain 81. In the receiving phase of their cycle of operation shown in Fig. 7 four of the flights 91 are positioned entirely clear of the rolls 61, 62 beyond their ends. The two remaining flights 91 are dwelling midway of the rolls where they are clear of the receiving ends of the rolls. Due to the synchronization of the delivery phase of flights 12 (Fig. 5) with this receiving phase of flights 91 (Fig. 7) an ear of corn can be delivered from outlet 103 to the receiving end of rolls 61 and another ear from outlet 104 to the receiving end of rolls 62 without interference from flights 91. This is an important and desirable mode of operation because if the flights 91 were simply moved around indiscriminately without reference to the movement of flights 12 and without dwelling in the clear position of Fig. 7 during the period of delivery of corn from flights 12 to the husking rolls, the flights 91 might become positioned opposite discharge outlets 103, 104 where they would obstruct the receiving ends of rolls 61, 62, in which case the flights would interfere with the ears of corn coming into proper contact with the rolls, with the result that such corn would be discharged from the machine without being thoroughly and properly husked. Consequently, by embodying my invention in a corn husker, the machine can be operated in a more rapid and efficient manner.

Two ears of corn to be husked will be discharged by respective flights 12 during the dwell, and the next two ears of corn will be discharged when the two flights 91 shown at the ends in Fig. 7 have reached the middle of the husking rolls. Therefore, the ears of corn will be subjected to a husking operation during the slow travel of the flights 91 before they engage the ears of corn. Thereafter, the ears of corn will be moved rapidly along the middle portion of the husking rolls and then slowly over the opposite end portions thereof to be subjected to a second husking operation, at the same time that the next two ears of corn are fed to the rolls. The next rapid movement of the flights 91 serves to eject the husked ears of corn from the opposite ends of husking rolls 61, 62.

There is an advantage in causing the ears of corn to dwell upon the rolls without substantial longitudinal movement because under these circumstances the rolls operate more efficiently to remove the husks from the ears. When the ears are moved along the rolls continuously there is a tendency to diminish the effectiveness of the operation of the rolls because the pressure of the flight on the ear of corn tends at times to diminish the contact between the corn and the rolls.

While I have shown and described the corn husker of my invention as embodied in a preferred manner, it is to be understood that my invention can be embodied in other forms. It is to be understood, therefore, that the scope of the invention is to be limited only by the claims appended hereto.

I claim:

1. In a corn husker, a pair of cooperatively engaged husking rolls disposed transversely to the length of the husker, means for effecting endwise progression of ears of corn along said rolls, driving means for said progression effecting means for effecting successive dwells in the movement thereof, a conveyor for progressing ears of corn longitudinally of the husker with the ears extending transversely thereof, and means for operating said conveyor for delivering said ears to said rolls during the dwells in the movement of said progression effecting means without changing the lengthwise positioning of the ears of corn.

2. In a corn husker, a pair of cooperatively engaged husking rolls disposed transversely to the length of the husker, positive means for effecting endwise progression of ears of corn ear by ear along said rolls, driving means for said progression effecting means for effecting successive dwells in the movement thereof and means for feeding the ears to said rolls during the dwells in the movement of said progression effecting means.

3. In a corn husker, two sets of husking rolls, means for progressing corn longitudinally of said rolls, drive means for said corn progressing means including means for effecting successive dwells in the operation thereof, and common means for feeding corn to the respective opposite ends of said sets of husking rolls during the dwells in the operation of the corn progressing means.

4. In a corn husker, two sets of husking rolls, means including a series of flights for progressing corn longitudinally of said rolls, drive means for said corn progressing means operable to effect successive dwells in the operation thereof to cause at least two dwells in the movement of each flight along said rolls, and common means for feeding corn to the respective opposite ends of said sets of husking rolls during the dwells in the operation of the corn progressing means, whereby an ear of corn engaged by a flight is subject to a plurality of husking periods during movement thereof along said rolls.

5. In a corn husker, a set of husking rolls, means for progressing corn longitudinally of said rolls, drive means for said corn progressing means operable to effect successive dwells in the operation thereof, and means for successively delivering corn to said rolls during said dwells.

6. In a corn husker, a set of husking rolls, a conveyor for delivering corn to said rolls, means for progressing corn longitudinally of said rolls, and drive means for said conveyor and said corn progressing means including an elliptical gear drive for effecting successive dwells in the movement of said corn progressing means in timed relation to the movement of said conveyor to provide for delivery of corn from said conveyor to said rolls during the dwells in the movement of said corn progressing means.

7. In a corn husker, two parallel sets of husking rolls, a conveyor common to both said sets of rolls for moving ears of corn in one direction along one set of husking rolls and in the opposite direction along the other set of husking rolls, and means common to both said sets of rolls for feeding ears of corn to the respective opposite ends of said sets of husking rolls.

8. In a corn husker, two parallel sets of husking rolls disposed transversely of the husker, a conveyor common to said sets of rolls for moving ears of corn in one directions along one set of husking rolls and in the opposite direction along the other set of husking rolls, drive means for said conveyor including means for effecting successive dwells in the movement thereof, and means for delivering ears of corn to the respective opposite ends of said sets, said delivering means being driven in synchronism with said conveyor to deliver ears of corn to said rolls during a dwell in the movement of said conveyor.

9. In a corn husker, means for preparing corn for a husking operation, a flight conveyor movable longitudinally of said husker for progressing two rows of corn through said preparing means, two parallel sets of husking rolls disposed transversely of said husker, beneath the discharge end of said conveyor, common means for progressing corn longitudinally of said sets of rolls, said progressing means being disposed relative to said sets of rolls to move the corn in one direction along one of said sets of rolls and in the opposite direction along the other of said sets of rolls, means operatively associated with said conveyor for delivering one row of corn to one end of one set of husking rolls and for delivering the other row of corn to the opposite end of the other set of husking rolls, and means for driving said conveyor and said corn progressing means in synchronized relation.

10. In a corn husker, means for preparing corn for a husking operation, two parallel sets of husking rolls, common means for progressing corn longitudinally of said sets of rolls, drive means for said corn progressing means including means for effecting successive dwells in the movement thereof, and means for delivering corn from said preparing means to said rolls during a dwell in the movement of said corn progressing means.

11. In a corn husker, means for preparing corn for a husking operation, a conveyor for progressing two rows of corn through said preparing means, two parallel sets of husking rolls, common means for progressing corn longitudinally of said sets of rolls, said progressing means being disposed relative to said sets of rolls to move the corn in one direction along one of said sets of rolls and in the opposite direction along the other of said sets of rolls, and chute means operatively associated with said conveyor for delivering one row of corn to one end of one set of husking rolls and for delivering the other row of corn to the opposite end of the other set of husking rolls.

12. In a corn husker, means for preparing corn for a husking operation, a conveyor for progressing two rows of corn longitudinally of the husker through said preparing means, two parallel sets of husking rolls mounted in transverse relation beneath said conveyor, means for progressing corn longitudinally of said sets of rolls, said progressing means being disposed relative to said sets of rolls to move the corn in one direction along one of said sets of rolls and in the opposite direction along the other of said sets of rolls, and a chute at the discharge end of said conveyor having stepped discharge points for delivery of one row of corn to one set of rolls adjacent one end thereof and for delivery of the other row of corn to the other set of rolls adjacent the end thereof opposite to said one end of said one set of rolls.

13. In a corn husker, a set of husking rolls, a conveyor operable to deliver ears of corn to said rolls at intervals, a second conveyor operable to move the ears of corn along said rolls, driving mechanism connected to said conveyors to operate said conveyors in a predetermined synchronism, including means associated with said second conveyor to transmit a cyclic movement thereto comprising a slow movement and a rapid movement, the synchronization of said conveyors and said driving mechanism being such that said slow movement is transmitted to said second conveyor at the time of the delivery interval of the first conveyor.

14. In a corn husker, a set of husking rolls, means operable to deliver ears of corn to the receiving portion of said rolls, one by one at regular intervals, a series of flights operable to move the ears of corn along said rolls, driving mechanism connected to said delivering means and to said flights, including a cyclic speed-varying device associated with said flights to change the speed of movement of said flights from slow to fast and back to slow again in each cycle, the synchronization of said delivering means, said flights, and said driving mechanism being such that said flights are positioned clear of said receiving portion of said rolls and are in the slow speed movement part of their cycle at said interval of delivery of corn to said husking rolls.

15. In a corn husker of the type adapted to handle a double file of ears of corn; two spaced-apart sets of parallel husking rolls, each of said sets of rolls having a receiving end and a discharge end, the receiving end of one set being located at the same side of the machine as the discharge end of the other set; means to deliver ears of corn from one file to the receiving end of one set of rolls and to deliver ears of corn from the other file to the receiving end of the other set of rolls; means to support an endless chain in the space between said two sets of husking rolls; flights attached to said chain and extending outwardly therefrom to overlie said rolls for engagement with ears of corn thereon; and driving mechanism to operate said delivering means and said endless chain whereby each of said flights will move an ear of corn from the receiving end of one set of rolls, discharge said ear from the discharge end of said rolls, then engage a second ear of corn on the receiving end of said other set of rolls, move said second ear to the discharge end of said other set of rolls and discharge said ear therefrom.

16. In a corn husker, a set of continuously rotating husking rolls, means for progressing ears of corn longitudinally along said rolls, and means for driving the ear progressing means including means for effecting successive dwells in the operation thereof to interrupt the movement of the ears along the rolls during the husking operation to thereby facilitate the husking of the ears.

17. In a corn husker, a set of continuously rotating husking rolls, means for feeding ears of corn to the husking rolls, means for progressing the ears longitudinally along the rolls, and means for driving the progressing means in timed relation with respect to the feeding means including means for effecting successive dwells in the operation of the progressing means to admit the ears to said rolls and to interrupt the movement of the ears along the rolls during the husking operation to facilitate the husking of the ears.

18. In a corn husker, two parallel sets of husking rolls disposed transversely of the corn husker, and an endless conveyor having one of its runs associated with one of said sets of rolls to move ears of corn in one direction therealong and discharge said ears at one side of the husker, said conveyor having another run associated with the other set of rolls to move ears of corn in the opposite direction therealong and discharge said ears at the other side of the husker.

19. In a corn husker, two parallel sets of husking rolls, an endless conveyor having one of its runs associated with one of said sets of rolls to move ears of corn in one direction therealong, said conveyor having another run associated with the other set of rolls to move ears of corn in the opposite direction therealong, and drive means for said conveyor including means for effecting successive dwells in the movement thereof to facilitate feeding of corn to said rolls.

20. In a corn husker, two parallel sets of husking rolls, and an endless conveyor having one of its runs associated with one of said sets of rolls for moving ears of corn in one direction therealong and having another run associated with the other set of husking rolls for moving ears of corn therealong in the opposite direction.

CHARLES E. KERR.